(12) United States Patent
Van Peursem et al.

(10) Patent No.: US 7,987,082 B2
(45) Date of Patent: Jul. 26, 2011

(54) SYSTEM AND METHOD FOR EFFICIENT COMPUTATION OF SIMULATED THERMODYNAMIC PROPERTY AND PHASE EQUILIBRIUM CHARACTERISTICS USING COMPREHENSIVE LOCAL PROPERTY MODELS

(75) Inventors: David J. Van Peursem, Irvine, CA (US); Gang Xu, Corona, CA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 12/698,063

(22) Filed: Feb. 1, 2010

(65) Prior Publication Data
US 2010/0223040 A1 Sep. 2, 2010

Related U.S. Application Data

(63) Continuation of application No. 11/109,840, filed on Apr. 19, 2005, now Pat. No. 7,676,352.

(60) Provisional application No. 60/563,375, filed on Apr. 19, 2004.

(51) Int. Cl.
G06F 9/455 (2006.01)
(52) U.S. Cl. .......................... 703/9; 73/25.01
(58) Field of Classification Search ............... 73/25.01, 73/204.25, 736, 24.05, 861, 736.24; 374/44; 252/67; 137/828; 60/641.2; 166/66.6; 702/27, 702/24; 700/299; 703/6, 9
See application file for complete search history.

(56) References Cited

U.S. PATENT DOCUMENTS

| | | | |
|---|---|---|---|
| 5,619,433 A | 4/1997 | Wang et al. | |
| 6,041,263 A | 3/2000 | Boston et al. | |
| 6,065,328 A * | 5/2000 | Dayton et al. | 73/25.01 |
| 6,209,387 B1 * | 4/2001 | Savidge | 73/24.05 |
| 6,323,882 B1 | 11/2001 | Jerome et al. | |
| 6,375,349 B1 * | 4/2002 | Gaal et al. | 374/44 |
| 6,442,512 B1 | 8/2002 | Sengupta et al. | |
| 6,442,515 B1 | 8/2002 | Varma et al. | |
| 6,450,024 B1 * | 9/2002 | McCulloch et al. | 73/204.25 |
| 6,560,514 B1 * | 5/2003 | Schultz et al. | 700/299 |

(Continued)

FOREIGN PATENT DOCUMENTS
WO 0102775 A1 4/2001

OTHER PUBLICATIONS

Kim et al., "Inverse estimation of thermophysical properties of anistropic composite", 2002.*

(Continued)

*Primary Examiner* — Kandasamy Thangavelu
(74) *Attorney, Agent, or Firm* — Conley Rose, P.C.

(57) ABSTRACT

A method of estimating a thermophysical property of a fluid using a local model is disclosed herein. The method includes generating, for use within the local model, a series expansion of thermodynamic equations relating to the thermophysical property and one or more derivatives involving the thermophysical property. The method further includes evaluating, based upon a set of specified values of parameters of the fluid, a first order term of the series expansion and a second order term of the series expansion. The values of the first order term and the second order term are then compared. A value of the thermophysical property is then automatically updated when the values of the first order term and the second order term are found to differ by more than a predefined amount.

18 Claims, 8 Drawing Sheets

U.S. PATENT DOCUMENTS

| | | | |
|---|---|---|---|
| 6,604,051 B1* | 8/2003 | Morrow et al. | 702/24 |
| 6,668,554 B1* | 12/2003 | Brown | 60/641.2 |
| 6,748,349 B1* | 6/2004 | Majumdar et al. | 703/9 |
| 2002/0003223 A1* | 1/2002 | Smith et al. | 252/67 |
| 2002/0166818 A1 | 11/2002 | Henriot et al. | |
| 2002/0175313 A1* | 11/2002 | Gu | 252/67 |
| 2002/0177986 A1 | 11/2002 | Moecket et al. | |
| 2003/0106380 A1* | 6/2003 | Bonne et al. | 73/861 |
| 2004/0026076 A1* | 2/2004 | Goodwin et al. | 166/66.6 |
| 2004/0069069 A1* | 4/2004 | Gysling et al. | 73/736 |
| 2004/0099321 A1* | 5/2004 | Schoeniger et al. | 137/828 |
| 2004/0158411 A1* | 8/2004 | Morrow et al. | 702/27 |

OTHER PUBLICATIONS

Aldana et al., "Crtical heat flux of CO2 in a microchannel at elevated subcritical pressures", 2002.*

U.S. Appl. No. 11/109,840 Non-Final Rejection mailed Aug. 1, 2007.

U.S. Appl. No. 11/109,840 Notice of Allowance mailed Oct. 30, 2009.

* cited by examiner

SYSTEM AND METHOD FOR EFFICIENT COMPUTATION OF SIMULATED THERMODYNAMIC PROPERTY AND PHASE EQUILIBRIUM CHARACTERISTICS USING COMPREHENSIVE LOCAL PROPERTY MODELS

CROSS-REFERENCE TO RELATED APPLICATIONS

This application is a continuation of and claims priority to U.S. patent application Ser. No. 11/109,840 filed on Apr. 19, 2005 now U.S. Pat. No. 7,676,352, entitled "System and Method for Efficient Computation of Simulated Thermodynamic Property and Phase Equilibrium Characteristics Using Comprehensive Local Property Models," which claims the benefit of priority under 35 U.S.C. §119(e) of U.S. Provisional Patent Application Ser. No. 60/563,375, entitled "System And Method For Efficient Computation of Simulated Thermodynamic Property and Phase Equilibrium Characteristics Using Comprehensive Local Property Models," filed on Apr. 19, 2004. The content of these applications is hereby incorporated by reference herein in its entirety for all purposes.

FIELD

The present invention relates generally to property models used by simulation, optimization and related applications. More particularly, but not exclusively, the present invention relates to methods and apparatus for efficiently computing simulated thermodynamic property and phase equilibrium characteristics using comprehensive local property models.

BACKGROUND

Complex industrial systems such as, for example, power generation systems and chemical, pharmaceutical and refining processing systems, have experienced a need to operate ever more efficiently in order to remain competitive. This need has resulted in the development and deployment of process modeling systems. These modeling systems are used to construct a process model, or flowsheet, of an entire processing plant using equipment or component models provided by the modeling system. These process models are used to design and evaluate new processes, redesign and retrofit existing process plants, and optimize the operation of existing process plants.

Simulation of complex industrial systems has been effected by using empirical models representative of the physical characteristics of such systems to identify and understand the factors contributing to behavior of the system. Any system that can be quantitatively described using equations and rules can be simulated. Dynamic process simulation generally involves simulating the performance of a proposed or existing plant or industrial process characterized by a performance that changes over time. One objective in modeling such a system is to understand the way in which it is likely to change so that the behavior of the system may be predicted and ways of improving the behavior through design or control modifications may be identified.

Dynamic process simulation typically involves performing calculations using numerous thermodynamic calculations, which can be extremely computationally intensive. One technique which has been employed in an effort to reduce the computational burden associated with calculation of thermodynamic functions centers around substituting an approximation for the functions. One such approximation, known as a Taylor series expansion, permits the extrapolation of a function given a reference point and independent variable sensitivity about that point. Considering a function $f(x)$ having continuous derivatives up to order $(n+1)$, expansion of $f(x)$ in the form of a Taylor series is as follows:

$$f(x) = f(a) + f'(a)(x-a) + \frac{f''(a)(x-a)^2}{2!} + \ldots + \frac{f^{(n)}(a)(x-a)^n}{n!} + R_n \quad (1)$$

In the past, Taylor series expansions have been used to characterize a discrete thermophysical property (e.g., density or enthalpy) within a simulation environment so as to form a "local model". In general, such a local model is applicable only within the immediate vicinity of a reference point at which the condition of the property is assumed to be known. Updating of such local models conventionally occurs at a frequency based upon a confidence delta threshold associated with the independent model parameters (i.e., temperature, pressure, and composition). One drawback of this approach is that the independence of temperature, pressure, and composition relative to the property model of interest tends to force unnecessary updates of the model in the case of linear properties. On the other hand, this approach also often results in updates being performed with insufficient frequency in cases of highly non-linear properties.

Local models have been used in conjunction with flash algorithms for the purpose of evaluating thermophysical properties within simulation environments. However, it has been required to solve the complex thermodynamic equilibrium and specification equations of the flash algorithms in addition to evaluating such local models, which tends to also require consumption of substantial computing resources.

SUMMARY

In summary, one aspect of the invention relates to a method of estimating a thermophysical property of a fluid using a local model. The method includes generating, for use within the local model, a series expansion of thermodynamic equations relating to the thermophysical property and one or more derivatives involving the thermophysical property. The method further includes evaluating, based upon a set of specified values of parameters of the fluid, a first order term of the series expansion and a second order term of the series expansion. The values of the first order term and the second order term are then compared. A value of the thermophysical property is then automatically updated when the values of the first order term and the second order term are found to differ by more than a predefined amount.

The present invention also relates to a method of estimating a thermophysical property of a fluid. The method includes generating a phase transition detection model referenced to a compressibility of the fluid. The method further includes receiving specified values for parameters of the fluid and providing the specified values to the phase transition detection model. The phase transition detection model is then utilized in order to determine whether the phase of the fluid has changed. If so, an updated value of the thermophysical property is calculated based upon the specified values of the fluid parameters.

In another aspect the present invention pertains to a different method of estimating a thermophysical property of a fluid. Consistent with this aspect of the invention, a first value of the thermophysical property and at least a second order series expansion of derivatives of the thermophysical property are calculated with respect to an initial set of specified values of parameters of a fluid. The method further includes receiving a set of currently specified values of the parameters of the fluid and determining whether the fluid has changed phase relative to a time corresponding to the initial set of specified values. Upon determining that the fluid has not changed phase, a second order term within the series expansion is evaluated with respect to the set of currently specified values of the parameters of the fluid. An updated value of the thermophysical property is then calculated when the magnitude of the second order term deviates by more than a predefined amount from a first order value of the series expansion.

Another aspect of the present invention relates to a method of estimating a thermophysical property of a fluid containing two or more phases. The method includes receiving an initial set of specified values of parameters of a fluid. The method further includes performing, based upon the initial set of specified values of the parameters of the fluid, an initial set of flash calculations in order to obtain a reference flash formulation and derivatives of the reference flash formulation wherein the derivatives are represented as a series expansion. The method also includes receiving a set of currently specified values of the parameters of the fluid. At least a second order term within the series expansion is then evaluated with respect to the set of currently specified values of the parameters of the fluid, thereby yielding a current magnitude of the second order term. An updated value of the reference flash formulation may then be calculated in accordance with the current magnitude of the second order term.

The present invention also pertains to a method for simulating a process using a digital processor, the process being characterized at least in part by a simulated fluid-conductive network having a plurality of nodes. The method includes initializing a top-level simulation routine by providing, to memory associated with the digital processor, initial values for nodal variables of the top-level simulation routine which characterize the nodes of the simulated fluid-conductive network. The method further includes executing, by the digital processor, the top-level simulation routine in accordance with the initial values. A local thermo routine called by the top-level routine is also executed by the digital processor. The local thermo routine includes a phase transition detection model referenced to a compressibility of a fluid within the fluid-conductive network, and is configured to return values of properties of identified ones of the plurality of nodes. Updated values of the nodal variables are then computed by the top-level simulation routine based upon the returned values of the properties.

In yet another aspect the present invention relates to a method for simulating a process using a digital processor, the process being characterized at least in part by a simulated fluid-conductive network having a plurality of nodes. The method includes initializing a top-level simulation routine by providing, to memory associated with the digital processor, initial values for nodal variables of the top-level simulation routine. The nodal variables characterize the nodes of the simulated fluid-conductive network. The method further includes executing, by the digital processor, the top-level simulation routine in accordance with the initial values. A local flash routine called by the top-level routine is also executed by the digital processor. The local flash routine is operative to compute a reference flash formulation and derivatives of the reference flash formulation, and is configured to return values of properties of identified ones of the plurality of nodes. Updated values of the nodal variables are then computed by the top-level simulation routine based upon the returned values of the properties.

Additional aspects of the present invention are described below in conjunction with the appended drawings.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF EMBODIMENTS

Overview

Figure 1:
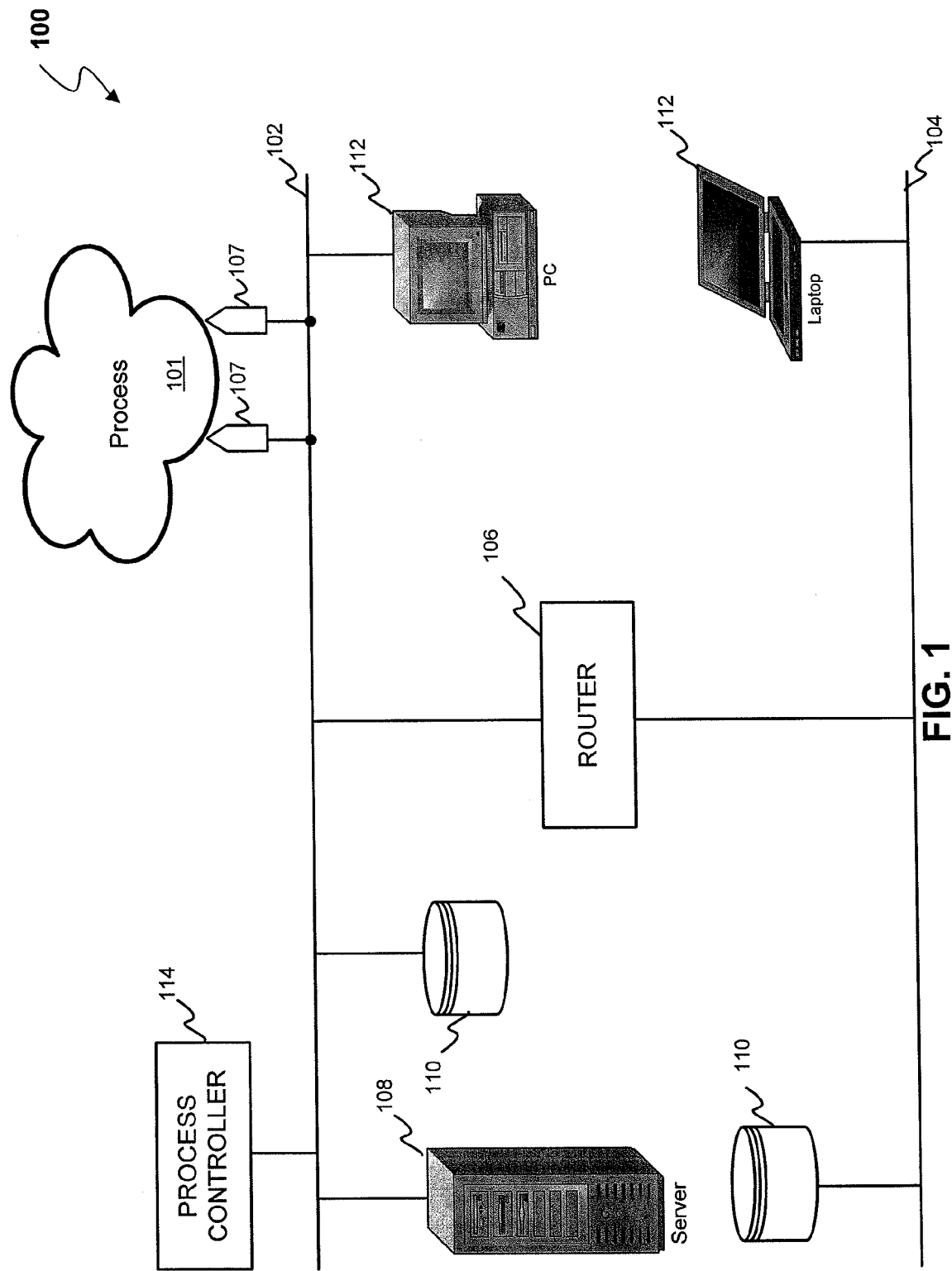
FIG. 1 illustratively represents the network architecture of a system within which one embodiment of the present invention may be incorporated.

A method for efficiently computing simulated thermodynamic property and phase equilibrium characteristics using comprehensive local property models has been developed. The method of the invention is capable of being utilized within a software environment disposed to provide dynamic simulation, optimization and other capabilities with respect to industrial and other processes. An exemplary dynamic simulation environment within which the teachings of the present invention may be incorporated is provided by the DYNSIM™ simulation application available from SimSci-Esscor™ unit of Invensys Systems, Inc.

Consistent with one aspect of the invention, comprehensive local models are developed for both thermodynamic property and phase equilibrium calculations. These local models are designed to implement a unique model-driven update strategy such that the timing of updates are dependent upon various characteristics of the local models. In the exemplary embodiments discussed below, updates are made only when the model determines that the condition or property of interest has deviated sufficiently from an initial reference value computed by the model. The local models also generally make use of discontinuity predictors in order to detect phase transitions. It has been found that use of these local models within dynamic simulation environments has enabled substantial performance improvements without sacrificing simulation accuracy.

As is discussed below, during operation of a higher-level simulation or other application operative within the applicable software environment, calls may be made to routines incorporating the above local models. In particular, a local thermodynamic or "local thermo" routine of the present invention may be invoked when the higher-level application requires computation of a given thermodynamic property. Similarly, the higher-level application may call a "local flash" routine of the present invention when it requires computation of a flash condition under specified circumstances.

In accordance with another aspect of the invention, a Taylor series expansion is applied directly to the applicable thermodynamic equilibrium equations executed by the local flash routine. Although local models have been used in the past in conjunction with flash algorithms for the evaluation of thermophysical properties, it is believed that a Taylor series expansion has not heretofore been directly incorporated within the thermodynamic equilibrium equations as contemplated by the present invention. It is believed that one obstacle to such a direct application of a Taylor series expansion has been the complexity and potential intractability of the mathematical expressions resulting from such direct application. However, various embodiments of the present invention apply bi-level programming techniques to such mathematical expressions so as yield analytic derivatives amenable to straightforward evaluation.

In the case of the local thermo routine, a unique automatic update strategy driven by the relevant model has resulted in substantially enhanced simulation performance. As is known, thermophysical properties are phase-dependent and can transition from one phase to another with changes in temperature, pressure, and composition. Consistent with the invention, the local thermo routine preferably relies upon a second order Taylor series expansion in the temperature, pressure, and composition domains to calculate the local property. The second order terms in the series are used to predict the deviation of the model from its initial, or "reference", value, thereby triggering an essentially automatic update of the model. In the exemplary embodiment changes in the ratio of PV/RT, commonly known as the compressibility factor (i.e., "Z"), are monitored in order to identify such potential phase transitions.

This automatic update strategy may also be employed by the local flash routine. However, the flash routine is configured to deal with multiple phases in equilibrium rather than with the thermophysical properties evaluated by the local thermo routine. In the context of a flash, phases can disappear and reappear with changes in temperature, pressure, and composition. In accordance with one aspect of the invention, specially formulated mathematical models capable of characterizing phase fraction V/F, L/F (and W/F) as F=V+L(+W), are utilized by the local flash routine in detecting potential phase transitions. Each such mathematical model is preferably formulated to function as a phase fraction descriptor simultaneously dependent upon temperature, pressure, composition and other specifications.

As is discussed in greater detail below, it has been found that different phase fraction descriptors are appropriate for use with different flash types. For example, for the single component flash it has been found that a pseudo vapor fraction $\theta=T-T_{sat}$ may be satisfactorily used as the descriptor. The pseudo vapor fraction is a measure of the degree of separation from the applicable saturation line. It follows that a phase transition in a single component flash may be conveniently detected by checking the value of this descriptor.

For the vapor-liquid multi-component flash, a K-value $$\left(K_i = \frac{y_i}{x_i}\right)$$

based approach is used to create a descriptor $\theta$ which is calculated from an extended Rachford & Rice equation; that is, the value of $\theta$ would be extended beyond the [0,1] region. Since the Rachford & Rice equation yields vapor fraction directly, the value of $\theta$ reflects the phase transition naturally.

For the vapor-liquid-liquid or vapor-liquid-water (water decant) flash, a Lagrange multiplier approach is used to create a set of descriptors $\lambda_i$ that are calculated from a modified multiphase mass balance optimization function. A phase transition is detected when one of the descriptors in this set changes sign.

System Environment

Turning now to FIG. 1, there is illustratively represented the network architecture of a system 100 within which one embodiment of the present invention may be incorporated. The system operates on a process 101, which may comprise any process including, without limitation, chemical processes, energy processes and distribution processes. In implementations involving chemical and other processes, the material in the process can be treated as a fluid that is moved within the process in streams. A process is normally made up of more than one unit of equipment, where each unit carries out some specific processing function, such as reaction, distillation, or heat exchange. Equipment units are interconnected and/or in fluid communication via streams. A plurality of plant sensors 107 are selected and configured to measure values of the regulatory variables applicable to the equipment units used to perform the process 101. These regulatory variables, e.g., pressure, temperature, level, and flow, are controlled to maintain process equipment operating at a designated stationary state. These variables may also be adjusted by the operator to move the process equipment to another stationary state (e.g., to increase production).

The system 100 may include a local area network (LAN) 102 that is connectable to other networks 104, including other LANs or portions of the Internet or an intranet, through a router 106 or similar mechanism. One example of such a LAN 102 may be a process control network to which process control devices, such as process controller 114, and plant sensors 107 are connected. Process control networks are well known in the art and are used to automate industrial tasks. The network 104 may be a corporate computing network, including possible access to the Internet, to which other computers and computing devices physically removed from the process 101 are connected. In one embodiment, the LANs 102, 104 conform to Transmission Control Protocol/Internet Protocol (TCP/IP) and Common Object Request Broker Architecture (COBRA) industry standards. In alternative embodiments, the LANs 102, 104 may conform to other network standards, including, but not limited to, the International Standards Organization's Open Systems Interconnection, IBM's SNA®, Novell's Netware®, and Banyon VINES®.

The system 100 includes a server 108 that is connected by network signal lines to one or more clients 112. In an exemplary embodiment the server 108 includes a UNIX or Windows NT-based operating system. The server 108 and clients 112 may be uniprocessor or multiprocessor machines, and may otherwise be configured in a wide variety of ways to operate consistent with the teachings of the present invention. The server 108 and clients 112 each include an addressable storage medium such as random access memory and may further include a nonvolatile storage medium such as a magnetic or an optical disk.

The system 100 also includes a storage medium 110 that is connected to the process control network 102 or corporate control network 104. In the exemplary embodiment the storage medium 110 may be configured as a database from which data can be both stored and retrieved. The storage medium 110 is accessible by devices, such as servers, clients, process controllers, and the like, connected to the process control network 102 or the corporate control network 104.

Suitable servers 108 and clients 112 include, without limitation, personal computers, laptops, and workstations. The signal lines may include twisted pair, coaxial, telephone lines, optical fiber cables, modulated AC power lines, satellites, and other data transmission media known to those of skill in the art. A given computer may function both as a server 108 and as a client 112. Alternatively, the server 108 may be connected to the other network 104 different from the LAN 102. Although particular computer systems and network components are shown, those of skill in the art will appreciate that the present invention also works with a variety of other networks and components.

Figure 2:
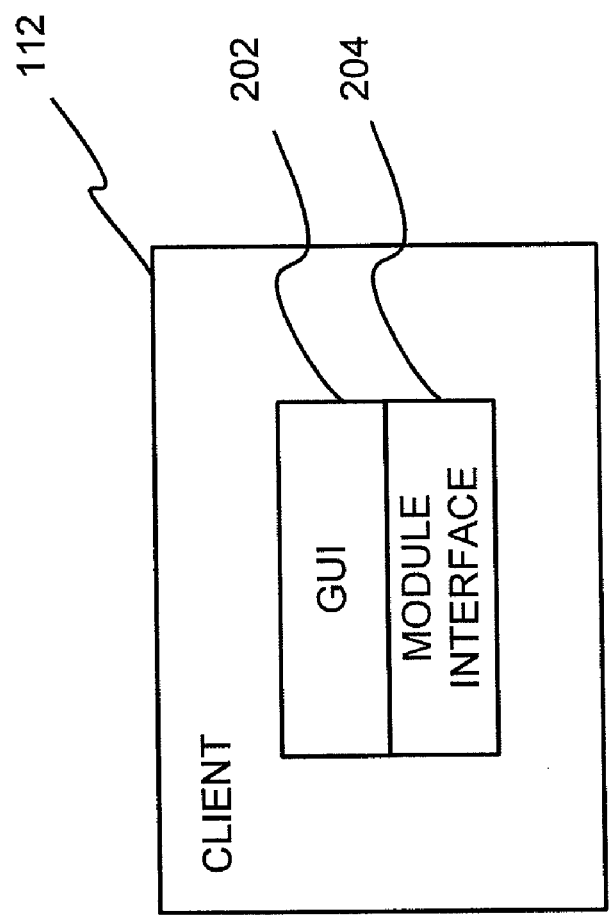
FIG. 2 illustrates an architecture of a client which may be used within an embodiment of the present invention.

FIG. 2 illustrates an architecture of the client 112 which may be used within an embodiment of the present invention. The client 112 provides access to the functionality provided by the server 108. The client 112 includes a GUI 202 and an optional module interface 204. The Graphical User Interface (GUI) 202 is used to build and specify model applications. One embodiment of the GUI 202 incorporates user interface features such as tree views, drag-and-drop functionality, and tabbed windows to enhance the intuitiveness and usability of the interface. The GUI 202 further enables access to other encapsulated GUIs such as process unit GUIs, non-process unit GUIs, and stream GUIs as described below.

Access to the GUI 202, as well as other architectural objects to be discussed in detail below, are through the optional module interface 204. In one embodiment, the module interface 204 is the Interface Definition Language (IDL) as specified in the CORBA/IIOP 2.2 specification. In one embodiment, the module interface 204 provides a uniform interface to the architectural objects, such as the GUI 202. The module interface 204 allows the actual implementation of the architectural objects, such as the GUI 202, to be independent of the surrounding architecture, such as the operating system and network technology. One of ordinary skill in the art will recognize that the module interface 204 may conform to other standards, or even be non-existent.

Figure 3:
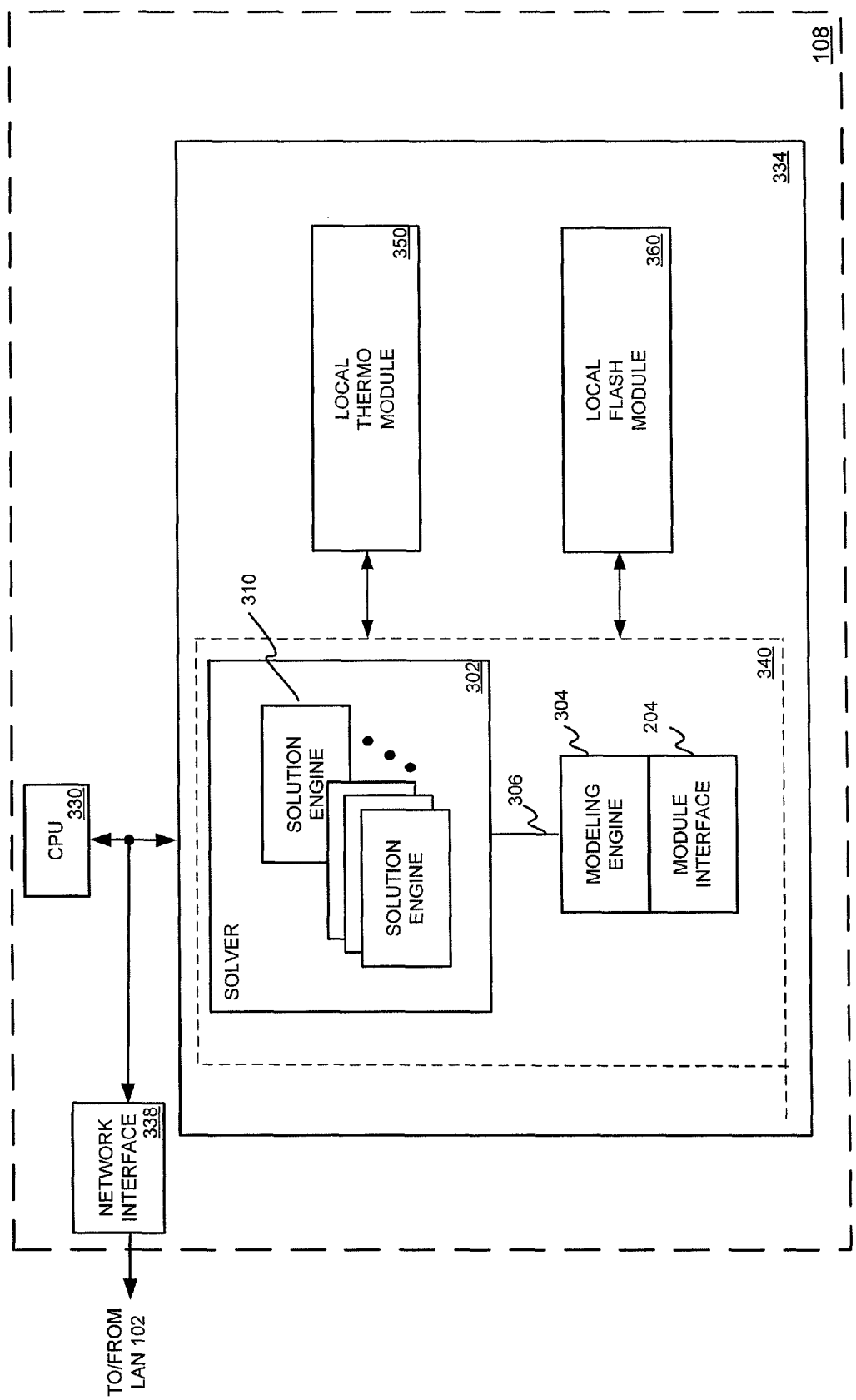
FIG. 3 is a block diagram representative of the internal architecture of the server included within the system of FIG. 1.

FIG. 3 is a block diagram representative of an exemplary internal architecture of the server 108, which may be physically implemented using a standard configuration of hardware elements. As shown, the server 108 includes a CPU 330, a memory 334, and a network interface 338 operatively connected to the LAN 102. The memory 334 stores a standard communication program (not shown) to realize standard network communications via the LAN 102. The memory 334 further stores a solver 302 accessible by a modeling engine 304 through an access mechanism 306, and a modeling engine framework 308. The solver, modeling engine 304, and modeling engine framework 308 collectively comprise a simulation module 340, such as the above-referenced DYN-SIM™ simulation application. The optional module interface 204 provides uniform access to, and implementation independence and modularity for both the modeling engine 304 and the modeling engine framework 308. As is discussed below, the memory 334 also stores a local thermo module 350 and a local flash module 360 each containing a set of computer programs which, when executed, effect computation of certain thermodynamic property and phase equilibrium characteristics in accordance with the present invention.

The modeling engine 304 provides an environment for building and solving process models. The solver 302 provides a solution algorithm for solving a process model generated by the underlying modeling engine 304. In one embodiment, the solver 302 may contain one or more solution engines 310 which are used in solving different process models. For example, one solver that may be used is Opera, a solver available from the Simulation Sciences unit of Invensys Systems, Inc. as part of the ROMeo System. In one embodiment, the solver 302 comprises a solution engine 310 implemented as a generalized matrix solver utilizing a Harwell subroutines. As is well known in the art, the Harwell library is an application independent library of mathematical subroutines used in solving complex mathematical equation sets. In one embodiment, the access mechanism 306 is specific to the solution engine 310 contained in the solver 302 and the modeling engine 304 used in generating the math model.

Figure 4:
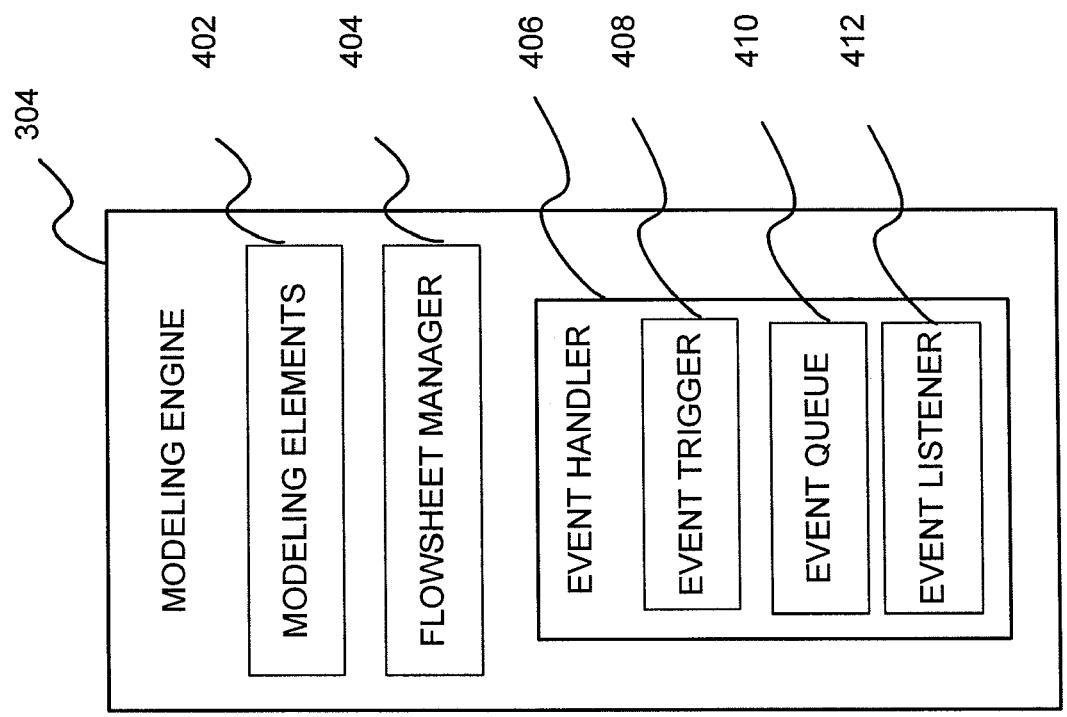
FIG. 4 further illustrates a set of components within an exemplary implementation of a modeling engine.

FIG. 4 further illustrates certain additional components comprising the modeling engine 304 in one preferred embodiment. The modeling engine 304 comprises model elements 402, a flowsheet manager 404, and an event handler 406. The model elements 402 include individual units and streams from which a user builds a flowsheet model. For example, a pump is a unit that the user may include in a flowsheet model.

A unit represents a device that may be found in a process plant. The unit may be a process or an on-process unit. A process unit is an item of operating hardware such as a heat exchanger, a compressor, an expander, a firebox, a pipe, a splitter, a pump, and the like. In one embodiment, each process unit typically has one or more entry or exit ports and is associated with a model. The model is a collection of variables and equations, collectively known as a calculation block. A unit model represents the operation of the unit in terms of its associated calculation block.

A stream is used to connect a unit's entry or exit port to another unit's exit or entry port respectively. Furthermore, a feed stream is connected to the unit's entry port, whereas a product stream is connected to the unit's exit port. A stream model may have associated equations and variables.

In one exemplary embodiment, multi-dimensional data structures are used to store individual units and streams, and their associated variables and equations. The data structures may also store other information such as, but not limited to, the type of unit or stream, whether a variable requires a user-provided value, the variable's lower bound, upper bound, solution value, or status. One of ordinary skill in the art will recognize that the data structures may be in the form of an array, linked list, or as elements within other data structures.

The flowsheet manager 404 provides access to instances of unit models, stream models, and other information associated with a flowsheet model. In the exemplary embodiment the steady-state process model database 140 is stored in the storage medium 110. The flowsheet manager 404 may then communicate with the model 140 within the storage medium 110 to provide a user access to the information contained therein in a manageable format. Further details regarding creation, modification and alteration of flowsheet models are provided in, for example, U.S. Pat. No. 6,442,512, entitled INTERACTIVE PROCESS MODELING SYSTEM; U.S. Pat. No. 6,442,515, which is entitled PROCESS MODEL GENERATION INDEPENDENT OF APPLICATION MODE; and U.S. Pat. No. 6,323,882, which is entitled METHOD AND SYSTEMS FOR A GRAPHICAL REAL TIME FLOW TASK SCHEDULER, each of which is hereby incorporated by reference in its entirety.

Figure 5:
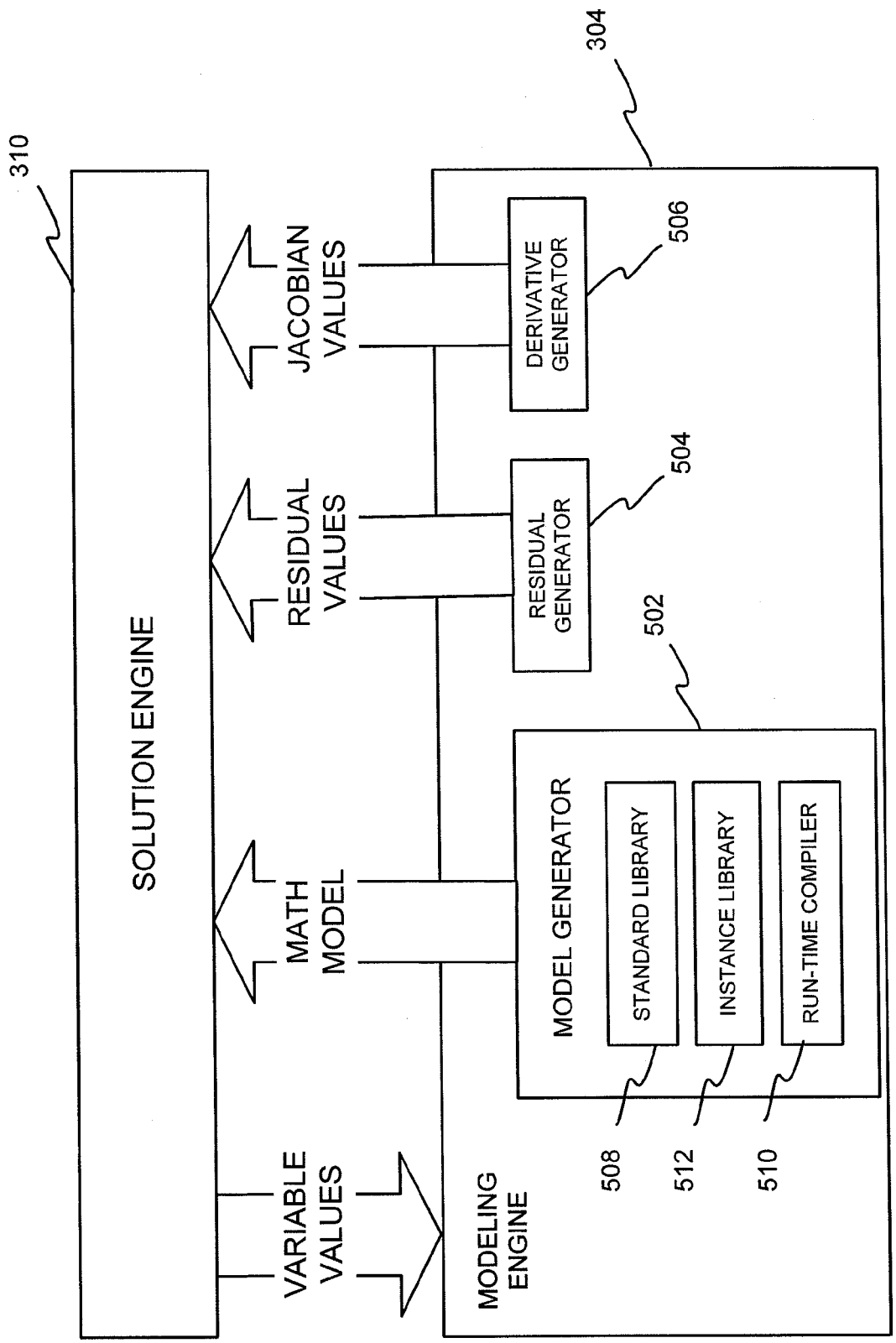
FIG. 5 further illustrates one embodiment of the interaction between the modeling engine and a solution engine of a simulation module.

FIG. 5 further illustrates exemplary interaction between the modeling engine 304 and the solution engine 310 of the simulation module 340. As is described in the above copending patent applications, the modeling engine 304 additionally comprises a model generator 502, a residual generator 504, and a derivative generator 506. The modeling engine 304 provides the open form of model equations to the solution engine 310. The solution engine 310, in turn, solves the equations. In an alternative embodiment, a closed form of the model equations may be provided by the modeling engine 304.

The model generator 502 creates a math model of the flowsheet for input to the solution engine 310. In the exemplary embodiment, the math model is a large set of equations and variables that comprehensively models all or part of the process 101. The math model will typically be in the form of a matrix which represents the equations contained in the flowsheet model in the form f(x)=0. Standard equations and variables associated with a corresponding unit model or stream model are provided in a previously compiled standard library 508. The equations may comprise mass, material, equilibrium, thermodynamic, and physical property related equations applicable to all or part of the process 101.

Local Flash and Local Thermo Modules

Equation-based simulators such as the simulation module 340 typically effect a desired simulation by operating on multiple levels. In particular, unit processes are characterized by a "top" level of a simulator used in simulation of a process model. During operation of the simulator, calls are made from this top level to mass and energy balance equations embedded in a lower simulation level. It is typical of equation-based simulators to operate through multi-level iteration of this type.

In what follows it is assumed that the simulation module 340 has initiated simulation of the process 101. In this case the variables of the top-level equations describing the process 101 are assumed to have at least been initialized, although the values of such variables may have not yet converged upon a correct solution of the equations. In particular, the simulation module 340 is assumed to have defined values for the variables (e.g., pressure, temperature, and composition) characterizing the nodes of a simulated fluid-conductive network. During operation of the simulation module, calls are made to the local flash module 360 and local thermo module 350 in order to obtain values of various properties at identified ones of these network nodes. On the basis of these properties, the simulation module 340 then computes a new solution for the values of the variables characterizing the network nodes. This process is then repeated until the simulation module 340 determines that the values of the nodal variables have converged upon a correct solution.

Mathematical Structure and Operation of Local Thermo Module

Figure 6:
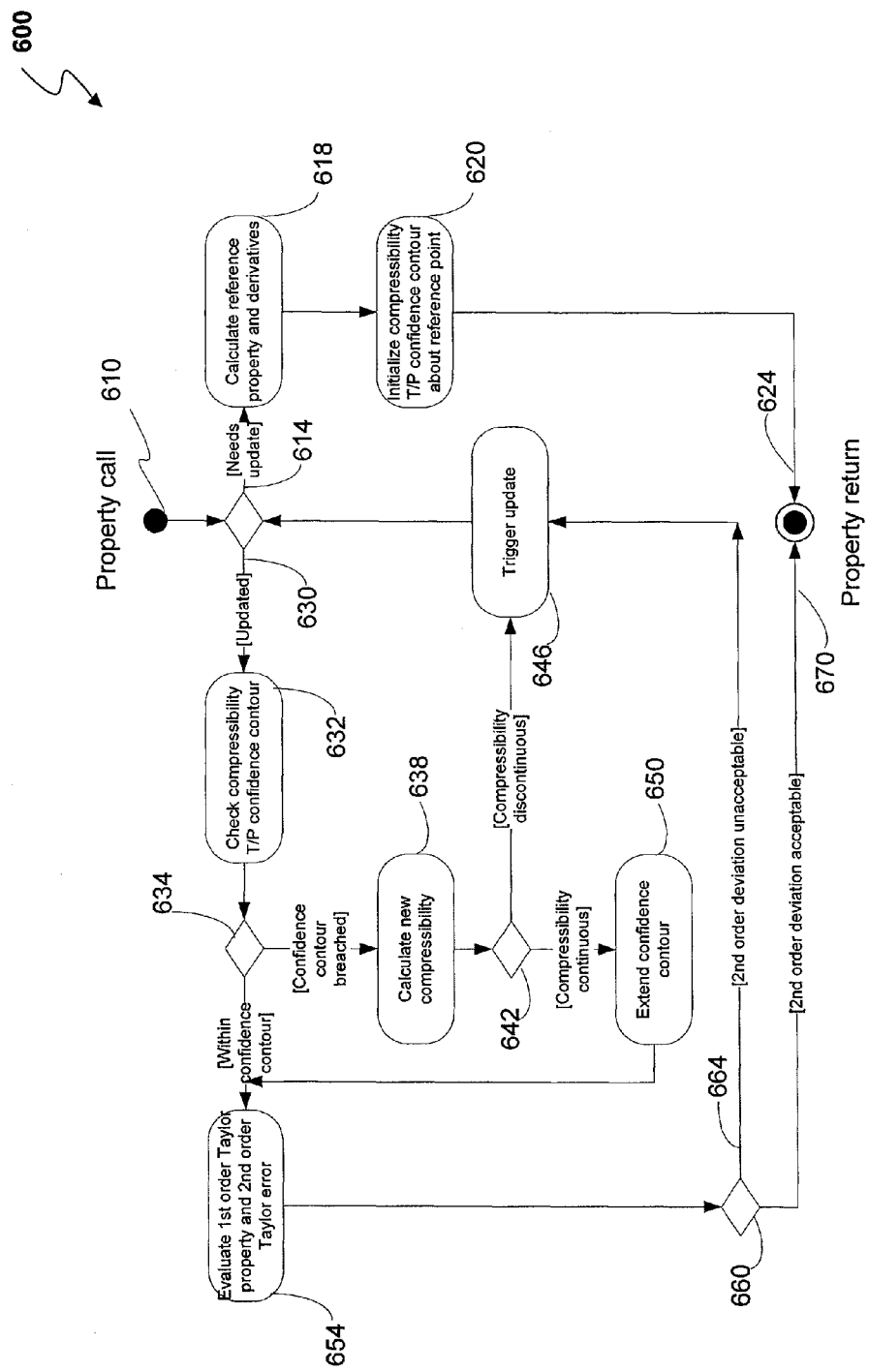
FIG. 6 shows a flowchart representative of the operation of a local thermo module responsive to calls from a top-level simulation routine.

Turning now to FIG. 6, there is shown a flowchart 600 representative of the operation of the local thermo module 350. When the routine executed by the local thermo module 350 is initially called 610 by the simulation module 340 and requested to compute the value of a given thermophysical property, processing occurs in accordance with the operations linked by branch 614 of the flowchart. In particular, an update is triggered to force the reference property and its derivatives (with respect to temperature, pressure, and composition) to be calculated (step 618). The required derivatives are governed by the second order Taylor series expansion and may be generally expressed as follows:

$$\tilde{p} = \bar{p} + \sum_i \Delta S_i \frac{\partial \bar{p}}{\partial S_i} + \frac{1}{2!} \sum_j \sum_i \Delta S_j \Delta S_i \frac{\partial^2 \bar{p}}{\partial S_j \partial S_i} \quad (2)$$

where $\bar{p}$ represents the property value at the reference temperature, pressure, and composition; $S_i$ represents the temperature, pressure and composition; and $\tilde{p}$ represents the approximation of the property value near to the reference conditions.

Figure 7:
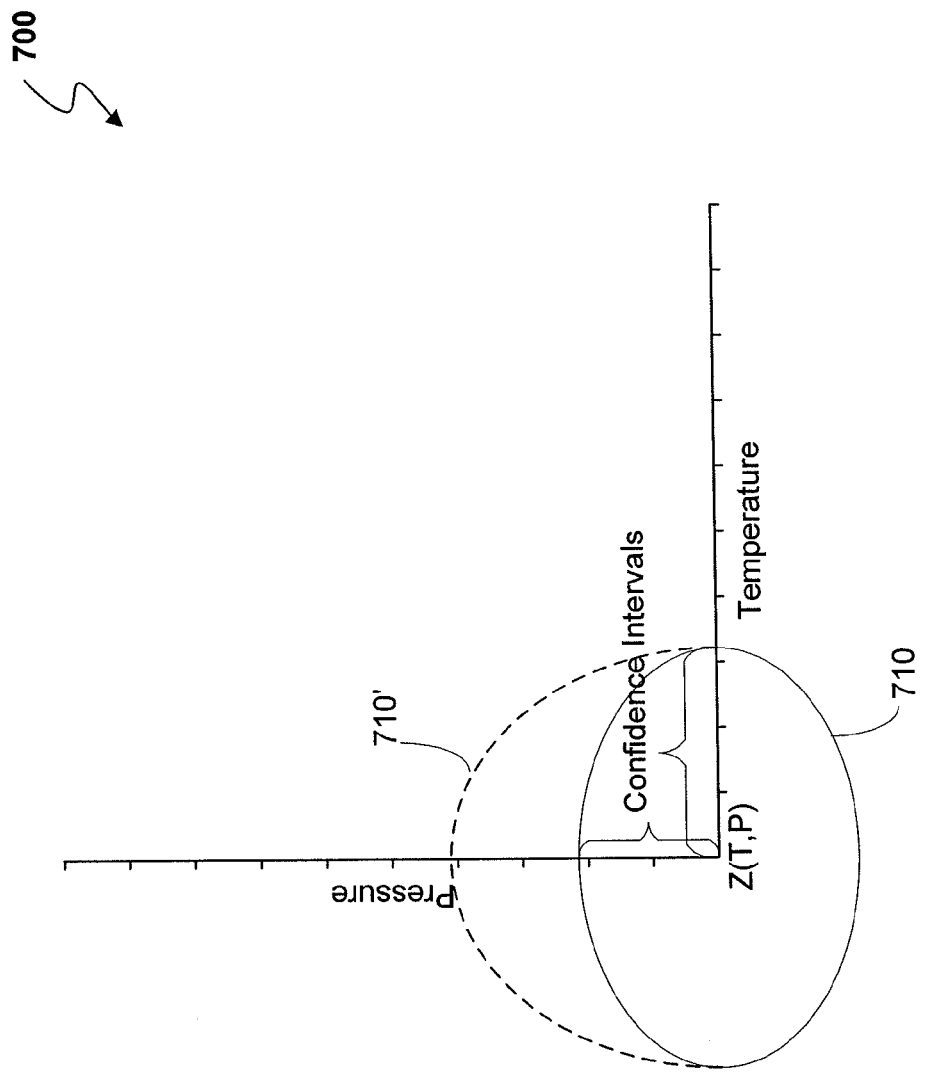
FIG. 7 provides a graphical representation of a confidence contour circumscribing a reference compressibility.

Referring again to FIG. 6, processing continues pursuant to branch 614 by initializing a phase transition detection model (step 620). Such initialization is achieved by specifying a confidence interval about the reference compressibility factor in the temperature and pressure domains. As is illustrated by the graphical representation 700 of FIG. 7, this results in a two-dimensional elliptic contour 710 about the reference compressibility; that is, FIG. 7 provides a graphical representation of a confidence contour circumscribing the reference compressibility. Processing in accordance with branch 614 is concluded by returning the requested property solution to the simulation module 340 (step 624).

Whenever the routine executed by the local thermo module 350 is subsequently called by the simulation module 340, processing is initiated at branch 630. As shown, an initial check 632 is performed on the compressibility contour 710 to determine if the new temperature/pressure point lies within the area bounded by it (step 634). If not (i.e., the new temperature/pressure point breaches the contour 710 either with respect to temperature or pressure), a new compressibility is calculated (step 638). It is then determined, based upon a heuristic change in compressibility, whether or not the change in compressibility has been continuous (step 642). If not, an update is triggered for the local thermo property (step 646). In the exemplary embodiment such a discontinuous change in compressibility is deemed to be indicative of a phase transition. If the change in compressibility is determined to be continuous, then the compressibility contour 710 is expanded in the temperature and/or pressure direction of the contour breach by a factor of the applicable confidence interval (step 650). The example of FIG. 7 illustrates the case in which the contour 710 was determined to have been breached in the pressure domain and the compressibility was determined to have remained continuous. As a consequence, the contour 710 has been expanded along the pressure axis by the applicable confidence interval, thus yielding the expanded contour 710'.

Once it has been determined that phase continuity has been maintained (step 634), the second order term of the Taylor series expansion (i.e., the last term in equation (2)) is evaluated (step 654). For non-linear properties, the second order term takes on a more dominant role in the evaluation of the local model. A confidence tolerance is placed on the acceptable magnitude of the second order term in relation to the first order Taylor model, and it is determined whether or not the second order deviation is acceptable (step 660). If not, then a property update 646 is triggered (step 664); otherwise, the local property is returned (step 670).

The updating described with reference to FIG. 6 has proven to be extremely efficient and self-monitoring. Specifically, if the thermophysical property passes through a linear regime, the second order term remains small and constant. If the thermophysical property passes through a non-linear regime, the second order term contribution increases until it is determined that a change of sufficient significance to invalidate the local model has occurred.

Mathematical Structure and Operation of Local Flash Module

When the routine executed by the local flash module 360 is called by the simulation module 340, it performs a flash calculation upon being provided with two specifications (for example, temperature and pressure for a TP flash, or enthalpy and pressure for a HP flash); a feed stream with bulk composition ($z_i$) for all the components; and the flash domain. Some applicable flash domains are: vapor only, liquid only, vapor-liquid equilibrium (VLE), or vapor-liquid-liquid2(water) equilibrium (VLLE or VLWE).

Consistent with fundamental thermodynamic principles, the routine executed by the local flash module 360 contemplates that a mixture at vapor-liquid phase equilibrium suggests Equality of temperatures: $T^v = T^l$ (3)

Equality of pressures: $P^v = P^l$ (4)

For each component i, equality of fugacities: $f_i^v = f_i^l$ (5)

See, for example, "Molecular Thermodynamics of Fluid-Phase Equilibria (Third Edition)", John M. Prausnitz, RüüN. Lichtenthaler, and Edmundo Gomes de Azevedo, page 51, ISBN: 0-13-977745-8.

Equations (3)-(5) summarize the equilibrium equation in the vapor-liquid equilibrium (VLE) domain. If the flash specifications provided by the simulation module 340 are temperature and pressure, then the temperature equality (Equation (3)) and the pressure equality (Equation (4)) would be omitted from the equilibrium equation, thereby yielding:

$$G_i = f_i^v(T, P, n_{vi}) - f_i^l(T, P, n_{li}) = 0, i=1,2,\ldots, nc \quad (6)$$

with unknown vector $$\left[\frac{n_{v1}, n_{v2}, \ldots, n_{l1}, n_{l2}, \ldots}{nc \quad \quad \quad nc}\right],$$

where nc represents the number of components.

If the flash specifications provided by the simulation module 340 comprise enthalpy and pressure, then the pressure equality (Equation (4)) would be dropped and one additional enthalpy equality $H_{total} = H_{vapor} + H_{liquid}$ would be added. Since temperature would become part of the unknown variables, further derivation of equilibrium equation gives $$G_i = f_i^v(T, P, n_{vi}) - f_i^l(T, P, n_{li}) = 0, i=1,2,\ldots, nc \quad (7)$$

$$G_{nc+1} = H_{total} - (H_v(T, P, n_{v1}, n_{v2}\ldots) + H_l(T, P, n_{l1}, n_{l2}\ldots)) = 0, \quad (8)$$

with unknown vector $$\left[T, \frac{n_{v1}, n_{v2}, \ldots, n_{l1}, n_{l2}, \ldots}{nc \quad \quad \quad nc}\right].$$

The flash solution generated by the local flash module 360 must meet the values of the two specifications provided by the simulation module 340, and the resultant phases must be in mass balance and in thermodynamic equilibrium. The composition distribution over all the resultant phases are defined according to the mass balance equation:

$$n_{total} z_i = n_v y_i + n_l x_i + n_l^{II} x_i^{II} \quad (9)$$

where $n_{total}$ represents the total molar flow-rate of the mixture (also written as F); $n_v$, $n_l$, $n_l^{II}$ represent the vapor, liquid, and liquid2(water) phase molar flow-rates, respectively (also written as V, L, and W); and $y_i$, $x_i$, and $x_i^{II}$ represent the composition of component i in the vapor, liquid, and liquid2(water) phases, respectively.

However, the flash solution generated does not have to meet the flash domain specified by the simulation module 340 upon invoking the local flash module 360. Thus, a single-phase solution would be valid when the VLE domain is specified, and a single-phase or two-phase equilibrium solution would be valid when the VLLE domain is specified. In these cases the flash solution is termed a degenerate solution, and one or two of $n_v$, $n_l$, and $n_l^{II}$ in the above mass balance equation would be equal to zero.

Figure 8:
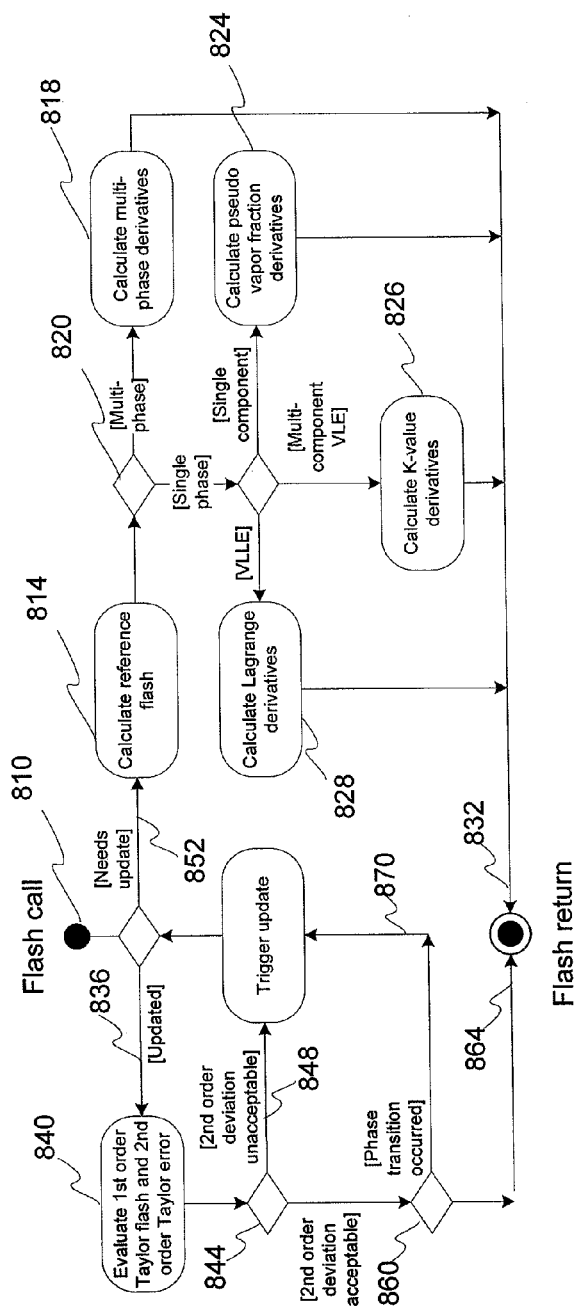
FIG. 8 is a flowchart representative of the operation of a local flash module responsive to calls from a top-level simulation routine.

FIG. 8 is a flowchart 800 representative of the operation of the local flash module 360. During the first call 810 to the routine executed by the local flash module 360, an update is triggered to force a reference flash and its derivatives (with respect to the feed ($Z_i$) and flash specifications) to be calculated (step 814). In this regard the reference flash corresponds to the results of the first set of flash calculations performed by the local flash module 360 with respect to a given localized simulation region. The required derivatives are governed by the second order Taylor series expansions set forth in general terms below:

$$T^* = T + \sum_i \Delta S_i \frac{\partial T}{\partial S_i} + \frac{1}{2!} \sum_j \sum_i \Delta S_j \Delta S_i \frac{\partial^2 T}{\partial S_j \partial S_i} \quad (10)$$

$$P^* = P + \sum_i \Delta S_i \frac{\partial P}{\partial S_i} + \frac{1}{2!} \sum_j \sum_i \Delta S_j \Delta S_i \frac{\partial^2 P}{\partial S_j \partial S_i} \quad (11)$$

$$n_{ji}^* = n_{ji} + \sum_i \Delta S_i \frac{\partial n_{ji}}{\partial S_i} + \frac{1}{2!} \sum_j \sum_i \Delta S_j \Delta S_i \frac{\partial^2 n_{ji}}{\partial S_j \partial S_i} \quad (12)$$

where T represents temperature, P represents pressure and $n_{ji}$ represents composition of component i in phase j. It is convenient to define the internal variables as the flash specification $S_i$, and component feed composition $Z_i$ (considered as part of $S_i$). Calculation of the model derivatives present within Equations (10)-(12) is achieved using the bi-level programming algorithm (step 818) in the manner described below.

If the reference flash results in a phase degenerated solution (step 820), the secondary local model introduced previously would be executed to get derivatives corresponding to possible phase transition (still using the bi-level programming algorithm). As is indicated by FIG. 8, there exist three cases capable of being characterized by this secondary local model: the pseudo vapor fraction derivatives for single component systems 824; the K-value approach for extended vapor fraction derivatives for vapor-liquid equilibrium of multi-component systems 826; and the Lagrange multiplier approach for vapor-liquid-liquid equilibrium of multi-component systems 828. Although a brief description of these secondary local models was previously provided, a more detailed description is given below. With the local flash module 360 now initialized, the local flash module 360 returns the reference solution to the simulation module 340 (step 832).

Whenever the routine executed by the local flash module 360 is subsequently called by the simulation module 340, processing is initiated at branch 836. In a step 840, the second order Taylor series terms in Equations (10)-(12) are evaluated in order to determine the acceptance threshold of the new local flash step. It is then determined whether or not the threshold suggests that the second order deviation is unacceptable (step 844). If so, an update is triggered (step 848) and processing would proceed through branch 852 in the manner described above. If the reference flash was phase degenerate, further detection would be performed using the secondary local model corresponding to the appropriate descriptor of phase fraction. The value of the corresponding descriptor would suggest either a possible phase transition or no phase transition (step 860). If the reference flash is not a phase degenerated solution and a phase transition has not occurred, then the current flash calculated by the Taylor model is returned to the simulation module 340 (step 864). If a phase transition has occurred, an update is triggered (step 870) and processing would proceed through branch 852 in the manner described above.

Use of Bi-Level Programming Algorithm Within Local Flash Module

As noted above, in an exemplary embodiment the model derivatives of the routine executed by the local flash module 360 are calculated using the bi-level programming algorithm. The bi-level programming algorithm is often applied in connection with the iterative solution of differential equations, which require that certain constraints be satisfied during iteration of the differential system; and has also found application as the solution algorithm for a non-linear constrained optimization problem. Both problems have internal variables embedded which must be solved to satisfied internal constraints at solution of the user-defined variables. The relation between these two sets of variables is known as variable sensitivity.

The local flash module 360 is configured to evaluate a "current" local flash within the nearby vicinity of a flash that has previously been solved, i.e., the "reference flash". If the user-defined variables are considered to be the feed composition and flash specification, then the solution of these user-defined variables can be approximated by equations (10)-(12) above. The internal constraints are satisfied by the reference flash and can be written (similar to equations (6)-(8)) in equation form as:

$$G_i = \Re(T, P, n_{ji}, S_i) = 0 \quad (13)$$

The variable sensitivities $$\frac{\partial T}{\partial S_k}, \frac{\partial P}{\partial S_k}, \frac{\partial n_{ji}}{\partial S_k}, \dots$$

are calculated linearly as $$0 = \frac{\partial \Re}{\partial T}\frac{\partial T}{\partial S_k} + \frac{\partial \Re}{\partial P}\frac{\partial P}{\partial S_k} + \sum_j \sum_i \frac{\partial \Re}{\partial n_{ji}}\frac{\partial n_{ji}}{\partial S_k} + \frac{\partial \Re}{\partial S_k} \quad (14)$$

which comes from the full differential of the reference flash, $$\Delta G_i = 0 \quad (15)$$

$$= \frac{\partial \Re}{\partial T}\Delta T + \frac{\partial \Re}{\partial P}\Delta P + \sum_j \sum_i \frac{\partial \Re}{\partial n_{ji}}\Delta n_{ji} + \sum_i \frac{\partial \Re}{\partial S_i}\Delta S_i$$

Notice that derivatives such as $$\frac{\partial \Re}{\partial T}, \frac{\partial \Re}{\partial P}, \frac{\partial \Re}{\partial n_{ji}}, \text{ and } \frac{\partial \Re}{\partial S_k} \text{ are}$$

straightforwardly solved and may be obtained, for example, directly from a thermodynamic property server. Those skilled in the art will appreciate that a thermodynamic property server comprises an independent software component disposed to return thermophysical properties and their derivatives with respect to the server's state variables. Such a thermodynamic property server is available from the assignee of the present invention under the trade name Modular Thermodynamics™ and is operative in the Gibbs domain (i.e., its state variables are temperature, pressure, and composition). A matrix [A] is created from $$\frac{\partial \Re}{\partial T}, \frac{\partial \Re}{\partial P}, \frac{\partial \Re}{\partial n_{ji}},$$

and a vector [B] is created from $$\frac{\partial \Re}{\partial S_k}.$$

Equation (14) can be written in a general linear form as [A]x=[B], where x represents the solution of the first order variable sensitivities $$\frac{\partial T}{\partial S_k}, \frac{\partial P}{\partial S_k}, \frac{\partial n_{ji}}{\partial S_k}.$$

Second order variable sensitivities can be calculated in linear form as [A]=x'=[B]'−[A]'x, which comes from the full differential of equation (14):

$$([A]x)' = [A]'x + [A]x' = [B]'. \quad (16)$$

Equation (14) is the bridge to calculating the variable sensitivity for the local model of flash. The variable sensitivity derivatives are calculated at the solution of the reference flash, equation (13). This comprises the application of the bi-level programming algorithm in the local flash calculation.

Phase Boundary Prediction

Thermodynamic phase equilibrium is stepwise continuous. This is to say that there are many thermodynamic equilibrium states, each of which is discontinuous at the boundary between the states. Included among the numerous possible equilibrium states are, for example, vapor only, liquid only, vapor-liquid, and vapor-liquid-liquid. The local flash model implemented by the local flash module 360 is capable of inherently detecting when a phase disappears. However, if the reference flash is initialized in a phase degenerate state, a secondary model is relied upon in order to predict phase discontinuities.

Thermodynamic phase equilibrium can be broadly classified into two areas: single component and multi-component. These are then further delineated into single phase, and multi-phase. Each of these equilibrium states has special characteristics such that they are optimally handled differently. When the local flash reference point resides in one of these regions, a secondary model is used to predict the phase discontinuity. For the case of a single component a pseudo vapor fraction local model is used to predict a phase discontinuity (step 824 of FIG. 8). For the multi-component vapor-liquid local flash, a K-value (phase distribution coefficient) local model is used to predict a phase discontinuity (step 826). For the multi-component n-phase local flash (i.e., any number of phases other than only vapor-liquid), a Lagrange multiplier local model is used to predict a phase discontinuity (step 828). As was discussed with reference to FIG. 8, when a phase discontinuity is predicted the local flash update is triggered.

In general, Equation (1) would provide a sufficient basis to predict fluid phase condition if the reference fluid is present within the applicable multi-phase region. That is, the function derivatives $f'(a)$, $f''(a)$, . . . characterize the fluid transition if a represents a point inside the multi-phase region of the fluid. If the next projection falls outside the multi-phase region, the values of $f(x)$ predicted from Equation (1) become physically meaningless; accordingly, a rigorous update of the local flash model would be triggered.

However, difficulties exist for predicting and updating the local flash model if a represents a reference point within any completely pure degenerated phase region. Thus, if a is a degenerated phase reference, a projection into a multi-phase region from a would not be predicted. To avoid such difficulties, secondary local models must be defined so that fluid transitions near a phase boundary can be directly represented.

Pseudo Vapor Fraction Local Model (Single Component)

For a single component flash, it is convenient to define a pseudo vapor fraction $$\hat{\theta} = T - T_{sat} \quad (17)$$

where $T_{sat}$ represents the saturation temperature at the reference pressure. The local model of equation (17) can be written as $$\hat{\theta} = \bar{\theta} + \sum_i \Delta S_i \frac{\partial \bar{\theta}}{\partial S_i} + \frac{1}{2!} \sum_i \sum_j \Delta S_i \Delta S_j \frac{\partial^2 \bar{\theta}}{\partial S_i \partial S_j} \quad (18)$$

where $\bar{\theta}$ represents the reference value of $T - T_{sat}$, $\Delta S_i$ represents the perturbation of the $i^{th}$ specification ($S_i$). For every single-chemical component, saturation temperature can be calculated at any given pressure by evaluating correlations such as the Antoine equation.

K-Value Local Model

For a multi-component vapor-liquid equilibrium flash, the phase boundary local model is exactly the same as equation (18), but $\hat{\theta}$ (or $\bar{\theta}$) is calculated from the Rachford & Rice equation:

$$\sum_i \frac{(K_i - 1)z_i}{1 + \theta(K_i - 1)} = 0, \quad \text{with } i = 1, 2, \ldots, nc \quad (19)$$

where $Z_i$ represents the mole fraction of component i of the feed stream, nc represents the number of components, and k-value $$K_i = \frac{\phi_i^l}{\phi_i^v},$$

as $\phi_i^l$ and $\phi_i^v$ represent the fugacity coefficient of the $i^{th}$ component in the liquid and vapor phase, respectively. The solution of $\theta$ for the Rachford & Rice equation normally falls into the region of [0,1]. However, when nc increases, equation (19) can become periodic and asymptotic lines begin to show up at $$\theta_i = -\frac{1}{K_i - 1}, \quad \text{with } i = 1, 2, \ldots, nc \quad (20)$$

Ranking all the asymptotic lines in order, a unique solution of θ for equation (19) exists within every adjacent pair of asymptotes. It follows that there would exist a total of nc−1 solutions of θ through the whole range of $[-\infty, +\infty]$. The meaningful solution un this situation would be the one inside or most close to the [0,1] region. If no solution within [0,1] can be found, in the exemplary embodiment the one closest to [0,1] is chosen as the solution for the Rachford & Rice equation.

Based upon equations (19) and (20), the reference value, $\bar{\theta}$ and corresponding derivatives, $$\frac{\partial \bar{\theta}}{\partial S_i}, \frac{\partial^2 \bar{\theta}}{\partial S_i \partial S_j}(S_i$$

may represent T, P, or component feed composition) can be calculated at the reference conditions.

Lagrange Multipliers Local Model

A phase boundary local model for vapor-liquid-liquid or vapor-liquid-water equilibrium is formulated somewhat differently than equation (18). Instead of a local model predicated upon as single variable ($\hat{\theta}$), a multi-variable local model is used to detect which of the phases may be generated first. This multi-variable local model (two variables in the case of vapor-liquid-liquid or vapor-liquid-water) may be expressed as:

$$\tilde{\lambda}_1 = \bar{\lambda}_1 + \sum_i \Delta S_i \frac{\partial \bar{\lambda}_1}{\partial S_i} + \frac{1}{2!} \sum_i \sum_j \Delta S_i \Delta S_j \frac{\partial^2 \bar{\lambda}_1}{\partial S_i \partial S_j} \quad (21)$$

$$\tilde{\lambda}_2 = \bar{\lambda}_2 + \sum_i \Delta S_i \frac{\partial \bar{\lambda}_2}{\partial S_i} + \frac{1}{2!} \sum_i \sum_j \Delta S_i \Delta S_j \frac{\partial^2 \bar{\lambda}_2}{\partial S_i \partial S_j}$$

where $\lambda_j$ represents the value of $$1 - \sum_i^{nc} x_{ji}$$

for phase j that has zero flow rate, and where $x_{ji}$ represents the un-normalized mole fraction of component i of phase j, which is calculated from $$x_{ji} = \frac{z_i}{K_{ji} \sum_l \theta_l / K_{li}} \quad \text{with } l = 1, 2, 3 \quad (22)$$

In Equation (22), $z_i$ represents the mole fraction of the feed component i; $\theta_l$ represents the real phase fraction of phase l; and $K_{li}$ (or $K_{ji}$) represents the composition distribution calculated from $$K_{li} = \frac{\theta_{li}}{\theta_{1i}} \quad \text{with } l = 1, 2, 3 \quad (23)$$

where $\phi_{1i}$, $\phi_{2i}$, $\phi_{3i}$ represent the fugacity coefficients of component i in the vapor, liquid, and liquid two (or water) phases, respectively.

The $\tilde{\lambda}_1$ and $\tilde{\lambda}_2$, which are calculated from equation (21), update an objective function $$f = (\tilde{\lambda}_1 \times \bar{\lambda}_1 < 0) \oplus (\tilde{\lambda}_2 \times \bar{\lambda}_2 < 0) \quad (24)$$

where × represents multiply, and ⊕ represent the logic OR.

A phase transition will occur when $f$ is true. Thus, if one of the $\lambda$ changes sign, the phase corresponding to that $\lambda$ will be generated and will trigger updating of the local flash model.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A computer implemented method of estimating a thermophysical property of a fluid in a process model, comprising:
    initializing a computer-based phase transition detection model, said initializing including specifying a confidence interval associated with the thermophysical property defining a compressibility contour about a reference compressibility factor in the temperature and pressure domains;
    determining, using a computer, a new temperature/pressure point;
    comparing, using the computer, the new temperature/pressure point to the confidence interval;
    calculating, using the computer, a change in compressibility if the temperature/pressure point is outside the confidence interval;
    determining, using the computer, based on said calculating, if the change in compressibility is continuous;
    responsive to said determining, generating, using the computer, an updated estimate of the thermophysical property; and
    storing the updated estimate in a memory associated with the computer.

2. The method of claim 1 further comprising expanding the compressibility contour if the change in compressibility is determined to be continuous.

3. The method of claim 1 wherein the generating comprises: determining a Taylor series expansion of the estimate of the thermophysical property; and
    generating the updated estimate of the thermophysical property based at least in part on the Taylor series expansion.

4. The method of claim 1 further comprising providing, as an output from the computer, a process model output, wherein said process model output is based at least in part on the updated estimate of the thermophysical property.

5. The method of claim 4 wherein the process model output is provided on a computer display device.

6. The method of claim 1 wherein the updated thermophysical property is used to control or adjust a process associated with the process model.

7. A computer system for estimating a thermophysical property of a fluid in a process model, comprising:
    a memory; and
    a processor coupled to the memory, said processor configured to perform process stages of:
    initializing a computer-based phase transition detection model, said initializing including specifying a confidence interval associated with the thermophysical property defining a compressibility contour about a reference compressibility factor in the temperature and pressure domains;
    determining a new temperature/pressure point;
    comparing the new temperature/pressure point to the confidence interval;
    calculating a change in compressibility if the temperature/pressure point is outside the confidence interval;
    determining based on said calculating, if the change in compressibility is continuous;
    responsive to said determining, generating an updated estimate of the thermophysical property; and
    storing the updated estimate in the memory.

8. The system of claim 7 wherein the processor is further configured to perform a stage of expanding the compressibility contour if the change in compressibility is determined to be continuous.

9. The system of claim 7 wherein the generating comprises:
    determining a Taylor series expansion of the estimate of the thermophysical property; and
    generating the updated estimate of the thermophysical property based at least in part on the Taylor series expansion.

10. The system of claim 7 wherein the processor is further configured to perform a stage of providing, as an output from the system, a process model output, wherein said process model output is based at least in part on the updated estimate of the thermophysical property.

11. The system of claim 10 further comprising a computer display device, wherein the process model output is provided on the computer display device.

12. The system of claim 7 wherein the processor is further configured to perform a stage of controlling or adjusting a process associated with the process model using the thermophysical property.

13. A computer program product comprising a computer readable storage medium including instructions for causing a computer to:
    initialize a computer-based phase transition detection model, said initializing including specifying a confidence interval associated with the thermophysical property defining a compressibility contour about a reference compressibility factor in the temperature and pressure domains;
    determine a new temperature/pressure point;
    compare the new temperature/pressure point to the confidence interval;
    calculate a change in compressibility if the temperature/pressure point is outside the confidence interval;
    determine, based on said calculating, if the change in compressibility is continuous;

responsive to said determining, generate an updated estimate of the thermophysical property; and
store the updated estimate in a memory associated with the computer.

14. The computer program product of claim 13 wherein the instructions include instructions for causing the computer to expand the compressibility contour if the change in compressibility is determined to be continuous.

15. The computer program product of claim 13 wherein the instructions for generating an updated estimate of the thermophysical property include instructions for:
   causing the computer to determine a Taylor series expansion of the estimate of the thermophysical property; and
   causing the computer to generate the updated estimate of the thermophysical property based at least in part on the Taylor series expansion.

16. The computer program product of claim 13 wherein the instructions further include instructions for causing the computer to provide a process model output, wherein said process model output is based at least in part on the updated estimate of the thermophysical property.

17. The computer program product of claim 16 wherein the instructions include instructions for causing the computer to provide the process model output on a computer display device.

18. The computer program product of claim 13 wherein the instructions further include instructions for controlling or adjusting a process associated with the process model using the updated thermophysical property.

* * * * *